(12) United States Patent
Murata

(10) Patent No.: US 6,663,210 B2
(45) Date of Patent: Dec. 16, 2003

(54) RENDERING APPARATUS AND METHOD, PRINTING APPARATUS, PRINTING CONTROL APPARATUS, AND CONTROL METHOD THEREFOR

(75) Inventor: Masahiko Murata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 10/020,300

(22) Filed: Dec. 18, 2001

(65) Prior Publication Data

US 2002/0080204 A1 Jun. 27, 2002

(30) Foreign Application Priority Data

Dec. 25, 2000 (JP) .......................... 2000-393175
Nov. 20, 2001 (JP) .......................... 2001-355223

(51) Int. Cl.$^7$ ............................ B41J 2/205; G09G 5/00
(52) U.S. Cl. .......................... 347/15; 345/564; 345/739
(58) Field of Search .................. 347/15, 43; 358/91.15, 358/1.2, 1.16, 1.8, 501, 524; 345/419, 602, 621, 739, 45.66, 564, 565

(56) References Cited

U.S. PATENT DOCUMENTS 6,429,948 B1 * 8/2002 Rumph et al. ............. 358/1.15

OTHER PUBLICATIONS

U.S. patent application No. 09/603,361, filed Jun. 26, 2000.

* cited by examiner

Primary Examiner—Lamson Nguyen
(74) Attorney, Agent, or Firm—Fitzpatrick, Cella, Harper & Scinto

(57) ABSTRACT

In a rendering apparatus for bitmapping object data into bitmap image data in accordance with a process list to generate rendering data, a plurality of addresses to the process list is designated. One of the plurality of designated addresses is selected. Object data is bitmapped into bitmap image data in accordance with the process list at the selected address to generate rendering data.

34 Claims, 9 Drawing Sheets

FIG. 2A

FORMAT OF PROCESS LIST

| 201 | 202 | 203 | 204 | 205 | 206 | 207 |
|---|---|---|---|---|---|---|
| MASK DATA NUMBER | COLOR DATA NUMBER | RENDERING POSITION | RENDERING LOGIC | RENDERING HEIGHT | ENLARGEMENT RATIO | ROTATION ANGLE |

FIG. 2B

FORMAT OF OBJECT DATA

| 211 | 212 | 213 | 214 | 215 | 216 | 217 |
|---|---|---|---|---|---|---|
| FUNCTION | SIZE | OFFSET | K DATA | Y DATA | M DATA | C DATA |

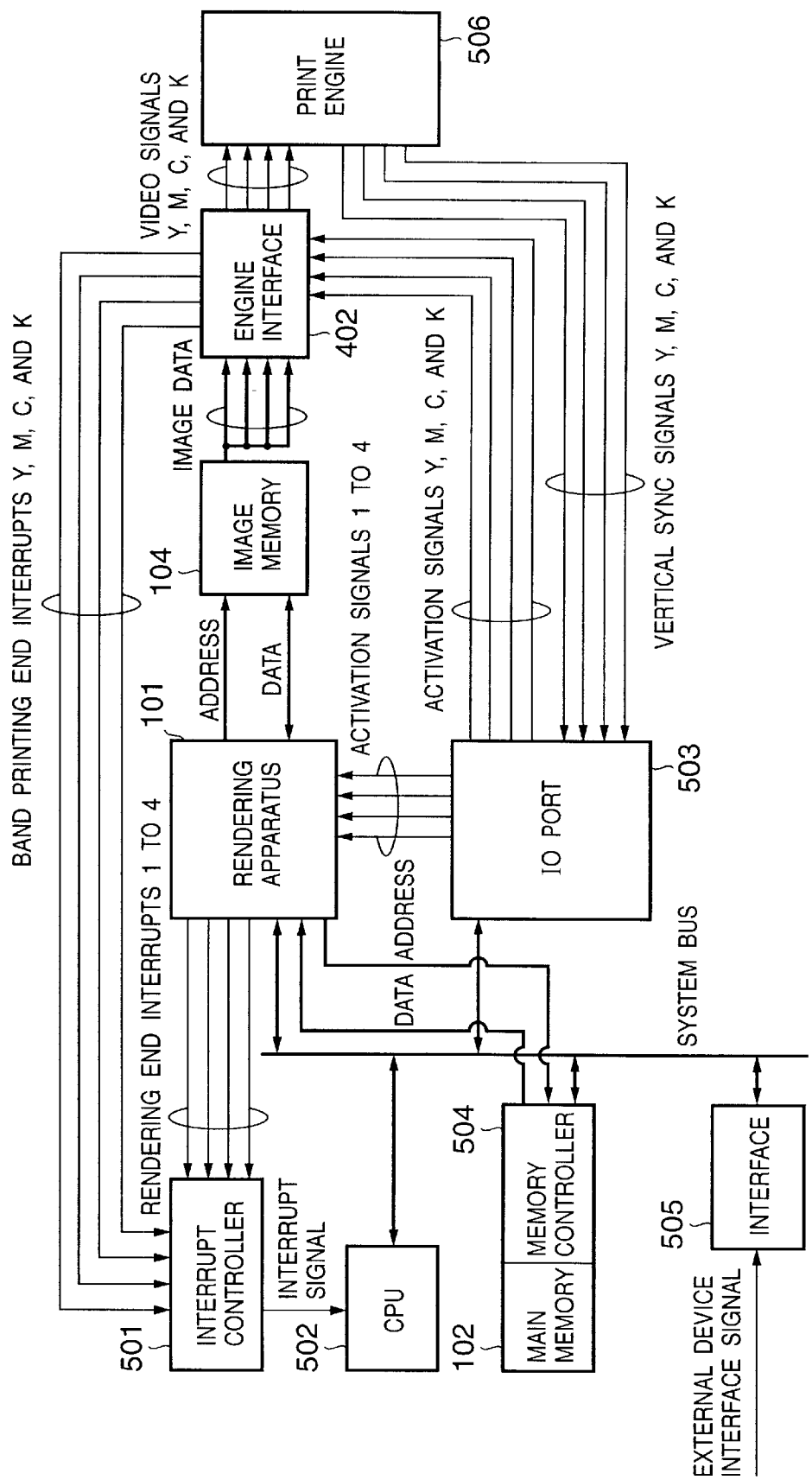

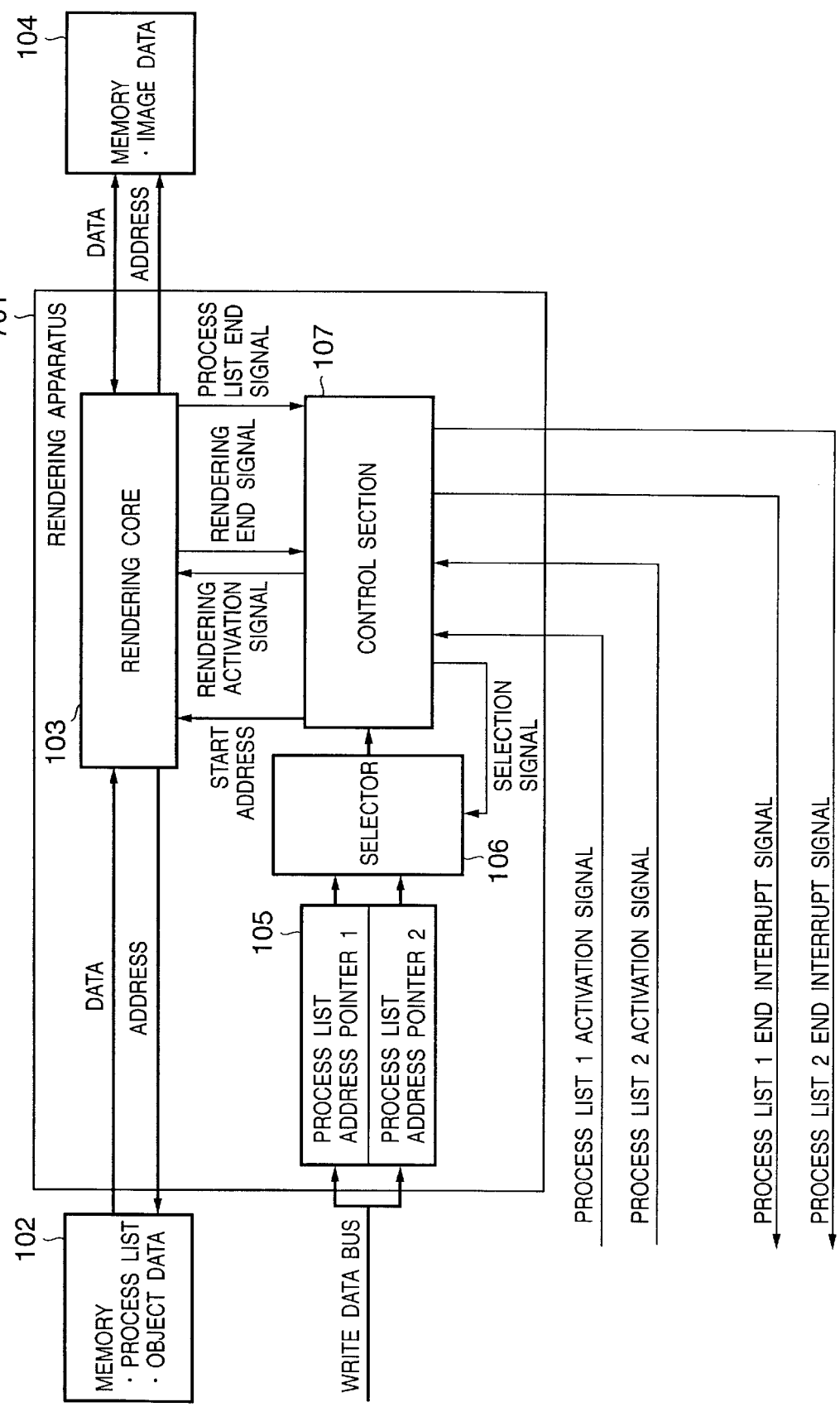

RENDERING APPARATUS AND METHOD, PRINTING APPARATUS, PRINTING CONTROL APPARATUS, AND CONTROL METHOD THEREFOR

FIELD OF THE INVENTION

The present invention relates to a rendering apparatus and method which receive print information from an information processing apparatus such as a host computer and output rendering data to a printing apparatus such as a page printer, and to a printing apparatus, a printing control apparatus, and control method for the apparatuses.

BACKGROUND OF THE INVENTION

Conventionally, in the printing apparatus of a printing system which is constituted by an information processing apparatus such as a host computer and the printing apparatus such as a page printer for receiving print information from the information processing apparatus and printing the information, since one rendering process list is rendered by a single rendering apparatus, a plurality of rendering process lists cannot be rendered in parallel.

To print using a color printing apparatus having four-color simultaneous print processes for simultaneously outputting images of four colors, i.e., Y, M, C, and K, a rendering apparatus is prepared for each of the four-color simultaneous print processes. Each rendering apparatus renders a rendering process list of a corresponding color and prints it by a corresponding print process.

Alternatively, a storage means is prepared for storing an image for at least one page, data of each color is rendered in turn by a single rendering apparatus, and the rendered image data is stored in the storage means. When the rendered image data for one page is assembled, printing is started.

However, in the prior art in which a plurality of rendering apparatuses are prepared, even when the rendering speed is higher than the printing speed of the printing apparatus, rendering apparatuses are required in number equal to the number of print processes, resulting in an increase in cost.

In the example in which a storage means for holding image data is prepared, an enormous storage capacity is necessary, resulting in high cost. In addition, unless images of all colors are generated, printing cannot be started. This decreases the printing speed.

SUMMARY OF THE INVENTION

The present invention has been made to solve the above problems, and has as its object to provide a rendering apparatus and method which can cause a single rendering apparatus to generate rendering data for a multicolor image.

It is another object of the present invention to provide a printing apparatus for printing on the basis of rendering data generated by the rendering apparatus that solves the above-described problems, a printing control apparatus, and a control method for the apparatuses.

In order to achieve the above objects, according to an aspect of the present invention, there is provided a rendering apparatus for bitmapping object data into bitmap image data in accordance with a process list to generate rendering data, comprising: address designation means for designating a plurality of addresses to the process list; selection means for sequentially selecting one of the plurality of addresses designated by the address designation means; and rendering means for bitmapping object data into bitmap image data in accordance with the process list designated by the selected address to generate rendering data.

According to another aspect of the present invention, there is provided a printing apparatus for simultaneously outputting images to a printing medium using a plurality of image output sections, comprising: a rendering processing section for bitmapping object data into bitmap image data in accordance with a process list to generate rendering data; address designation means for designating addresses of a plurality of process lists to be processed by the rendering processing section; rendering control means for causing the rendering processing section to alternately execute rendering processing for the process lists at the plurality of addresses designated by the address designation means; and a plurality of image output sections for parallelly outputting a plurality of rendering data corresponding to the process lists obtained by the rendering control means to the printing medium.

According to still another aspect of the present invention, there is provided a printing control apparatus for outputting image data to a plurality of image output sections for simultaneously outputting images to a printing medium, comprising: a rendering processing section for bitmapping object data into bitmap image data in accordance with a process list to generate rendering data; address designation means for designating addresses of a plurality of process lists to be processed by the rendering processing section; rendering control means for causing the rendering processing section to alternately execute rendering processing for the process lists at the plurality of addresses designated by the address designation means; and output control means for outputting the plurality of rendering data corresponding to the plurality of process lists obtained by the rendering control means to a printing apparatus to make the plurality of image output sections simultaneously output the rendering data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2A and 2B are views showing the formats of a process list and object data;

FIG. 5 is a block diagram showing the schematic arrangement of a color printer according to the first embodiment;

FIG. 7 is a block diagram showing the schematic arrangement of a rendering apparatus according to the second embodiment.

DETAILED DESCRIPTION OF THE PREFERRED EMBODIMENTS

The embodiments of the present invention will be described below in detail with reference to the accompanying drawings.

In the embodiments, a plurality of address pointers for designating rendering process lists are prepared, and rendering operations indicated by the respective pointers are independently performed. Additionally, a means for independently activating rendering process lists indicated by the respective pointers is prepared to independently control the image generation timings. Furthermore, a means for independently generating an interrupt that represents an end for processing of rendering process lists indicated by the pointers is prepared to independently recognize the end of image generation.

First Embodiment

Figure 1:
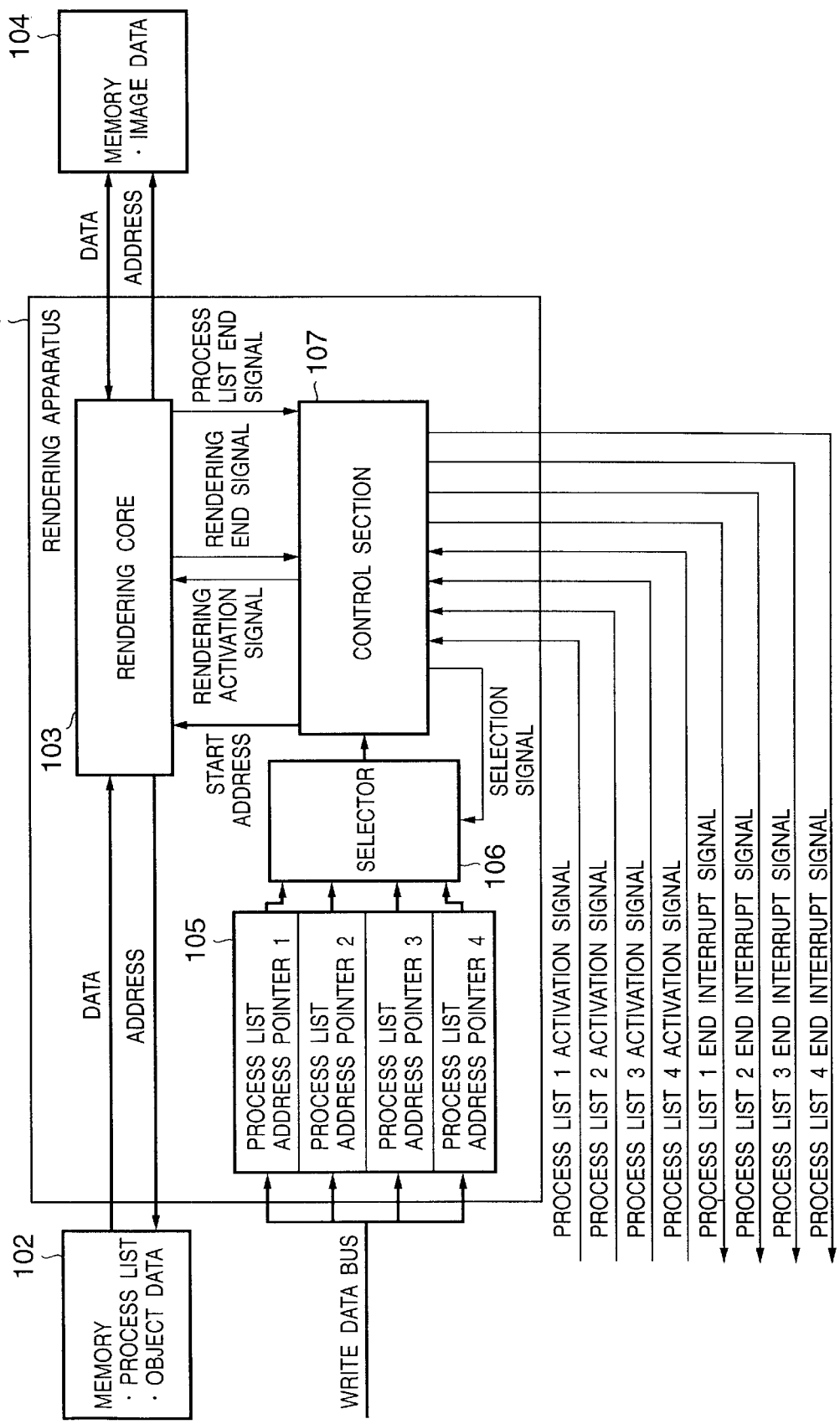
FIG. 1 is a block diagram showing the schematic arrangement of a rendering apparatus according to the first embodiment.

FIG. 1 is a block diagram showing the schematic arrangement of a rendering apparatus according to the first embodiment. Referring to FIG. 1, reference numeral 101 denotes a rendering apparatus; 102, a memory which stores rendering process lists (to be simply referred to as "process lists" hereinafter) and rendering object data; 103, a rendering core for actually generating an image from rendering object data in accordance with the description of a process list; 104, a memory in which the generated image is written; 105, four address pointers holding the addresses of the process lists; 106, a selector for selecting one address pointer in accordance with the selection signal from a control section (to be described later); and 107, a control section for controlling the rendering operation of the rendering apparatus 101.

In this embodiment, four address pointers 105 are prepared. The address pointers hold the addresses of process lists to be simultaneously processed in the memory 102. At the time of activation, the start address of each process list is set outside the rendering apparatus 101 in advance.

In the above arrangement, the rendering core 103 forms image data on the memory 104 on the basis of a process list and rendering object data, which are prepared on the memory 102 in advance. Every time one process list address pointer is executed, the control section 107 switches the selection signal to be output to the selector 106 to input the next process list address pointer and outputs a start address indicated by the address pointer to the rendering core 103. The control section 107 outputs a rendering activation signal to the rendering core 103 to make it start one rendering process from the start address.

The rendering core 103 executes one rendering process indicated by a process list, as described above. When the rendering process is ended, the rendering core 103 outputs a rendering end signal to the control section 107 to notify it of the end. Upon receiving the rendering end signal, the control section 107 increments the value of the address pointer of the executed process list by one, though it is not illustrated, to set the start address of the next process list. After that, the control section 107 switches the selection signal to select the next process list address pointer and executes a similar rendering process.

As shown in FIG. 1, an activation signal is prepared for each address pointer 105 so that the address pointers 105 can be independently activated outside the rendering apparatus 101. Upon recognizing that the executed rendering process is the final process of the process list, the rendering core 103 outputs a process list end signal to the control section 107 together with the rendering end signal. The control section 107 receives the signal and outputs the end interrupt of the process list having the corresponding number to the outside.

As described above, the plurality of process lists are independently activated by the activation signals and handled as objects to be selected by the selector 106 until an end interrupt is generated. When only one process list is being activated, processes indicated by the address pointer of one process list are continuously executed.

FIGS. 2A and 2B are views showing the formats of a process list and object data. FIG. 2A shows the format of one process command of a process list. A process list is constructed as a command chain of such process commands. An end command is added to the end of a command chain to indicate the end of a series of rendering operations. As shown in FIG. 2A, a process command comprises a portion representing rendering object data such as a mask data number 201 and color data number 202, rendering position information 203 representing coordinates at which an object is to be rendered on the image memory, a rendering logic 204 for designating the function of the logical operation of image data already formed on the memory and an image generated by a rendering command, and an operation for object data where a rendering height 205 for designating the number of lines to be rendered, an enlargement ratio 206, and a rotation angle 207 are input.

The rendering core 103 receives the above-described process command from the memory 102 at the start address designated by the control section 107 as a process command, generates the address of mask data from the mask data number 201 in the process command, and reads out mask data from the memory 102. The rendering position information 203 also reads out the color data number 202 from the memory 102. For the descriptive convenience, two object data, i.e., the mask object and color object are designated for one rendering process. In a rendering process of this type, generally, a density is added to a pattern object by a color object, and the pattern object is clipped by a mask object. If densities are to be separately added to white and black portions of a pattern expressed by a pattern object, and the pattern object is to be clipped by a mask object, the process command designates the mask object, pattern object, and two color objects. Alternatively, not density data but image data may be designated as pattern data or color data.

The number of object data to be designated is irrelevant to the present invention. An example in which two object data are designated will be described here. The clipping operation is realized by the rendering logic represented by the process command for these data, including image data at rendering coordinates that are already present on the memory. A rendering logic used when pattern data with colors, i.e., a density is clipped by mask data and ORed with an existing image is as follows.

(Mask and Pattern and Color) or Existing Image

When mask data to be clipped is a character or graphic pattern, it may be processed by the enlargement ratio 206 or rotation angle 207 in the process command in advance and then rendered.

FIG. 2B shows the format of object data. A function 211 designates an object type such as a bitmap character, compressed character, compressed graphic pattern, image data, or color density pattern. A size 212 designates the size of object data. An offset 213 designates the data of each color, i.e., the offset between K, Y, M, and C object data. For example, when K object data is used, an address following the offset 213 is directly set as the start address. For Y object data, the offset 213 is added to the start address of K. For M object data, the offset 213 is added to the start address twice. For C object data, the offset 213 is added to the start address three times to obtain the start address of the object data.

That is, K, Y, M, and C object data are stored next to the offset 213 in a predetermined format for the data type. Mask data used for clipping is normally achromatic data and therefore has only K data. The format changes depending on the data type, through a detailed description thereof will be omitted here.

Rendering operation in the rendering apparatus 101 shown in FIG. 1 will be described next.

Figure 3:
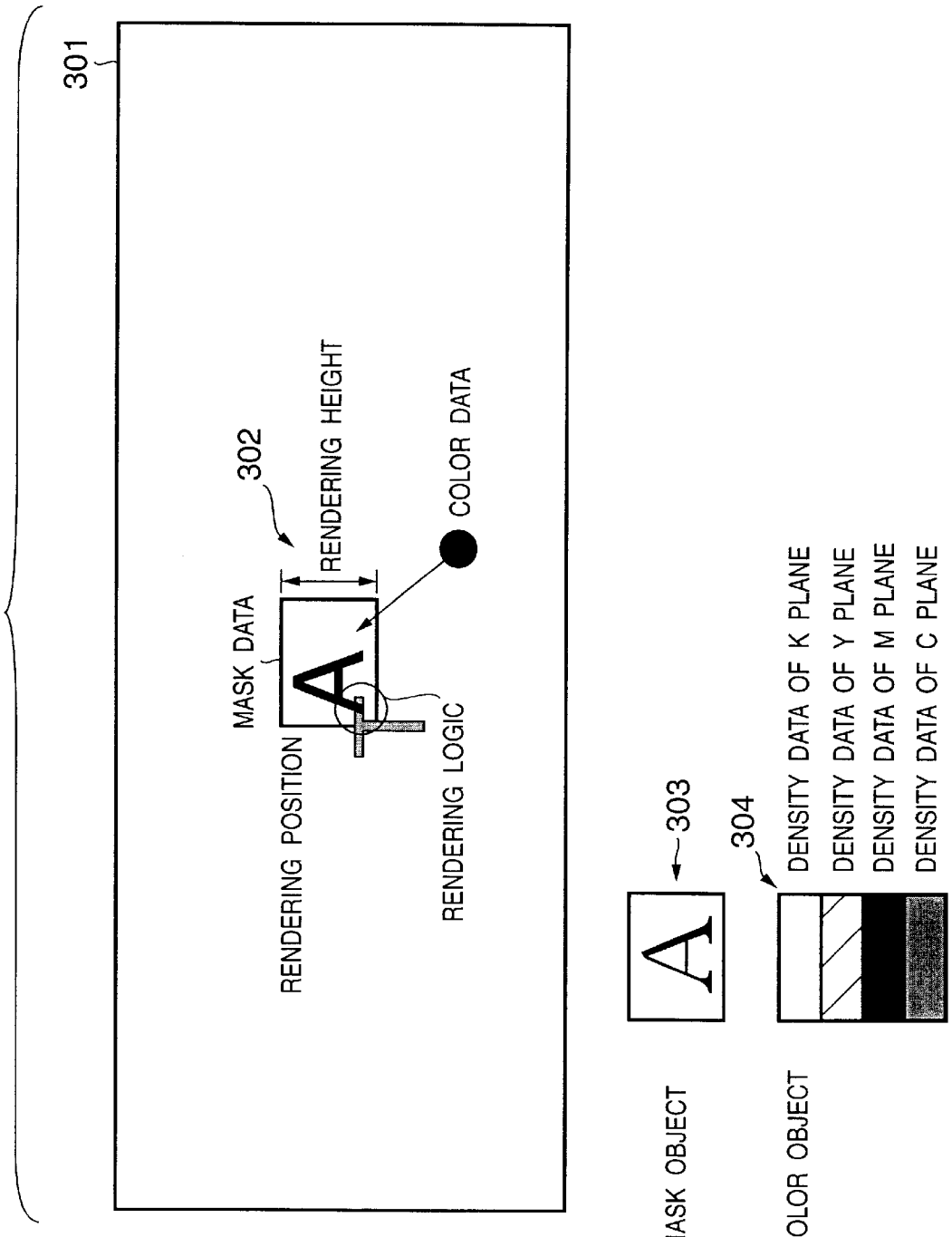
FIG. 3 is a view for explaining rendering operation in a rendering apparatus 101.

FIG. 3 is a view for explaining rendering operation in the rendering apparatus 101. Referring to FIG. 3, reference numeral 301 denotes an image area to be printed; 302, a rendered image; 303, mask object data to be rendered; and 304, density data of a color object to be clipped, i.e., bitmap image data with a density pattern of K, Y, M, and C. That is, in the example shown in FIG. 3, at the rendering position indicated by the process command, a mask object, font "A", and an M plane color density are logically operated with an image "T" rendered in advance as image data using a designated rendering logic and written on the image memory in the number of lines of the rendering height.

Figure 4:
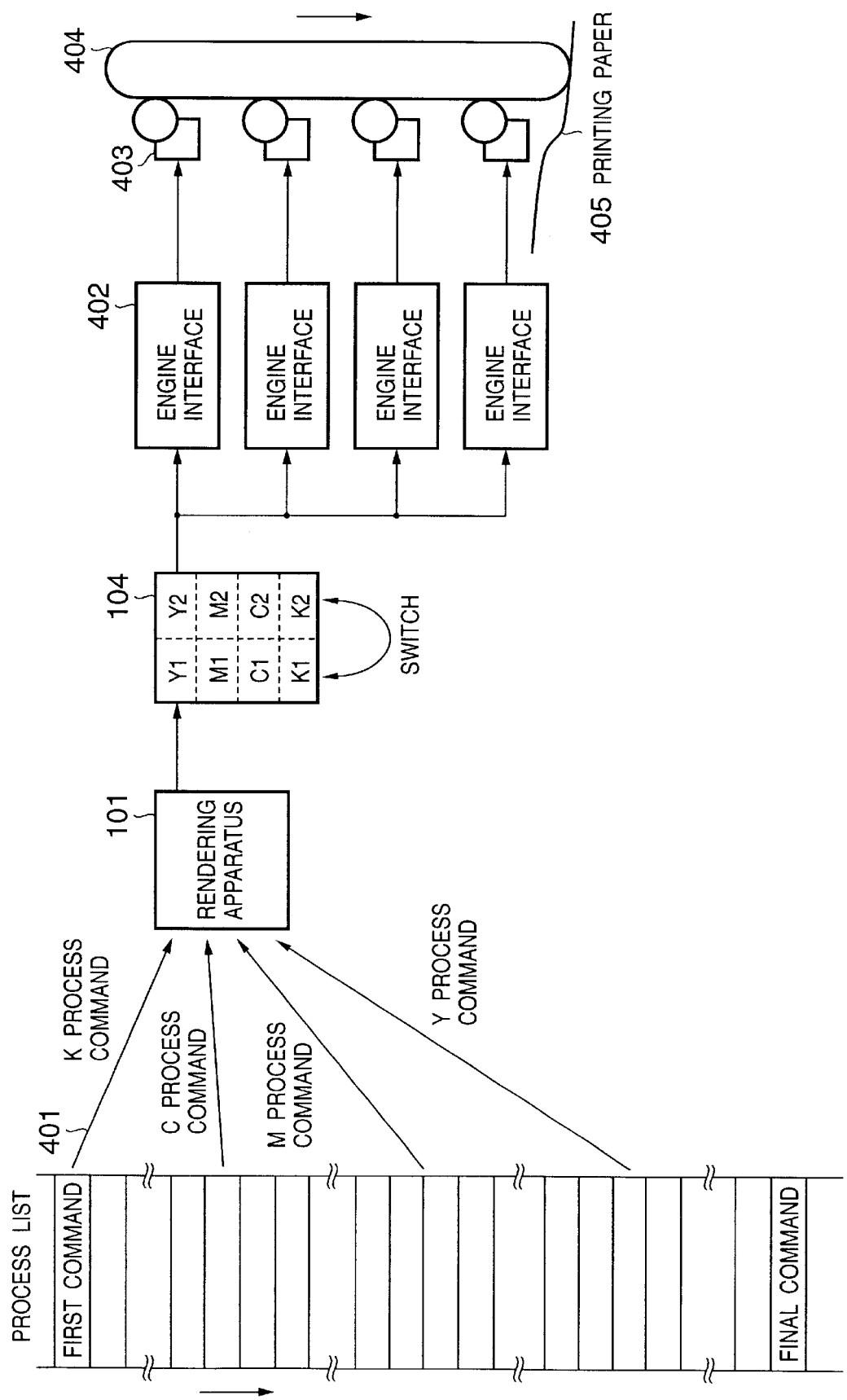
FIG. 4 is a view for explaining rendering of color image data by the rendering apparatus 101.

FIG. 4 is a view for explaining rendering of color image data by the rendering apparatus 101. In the example shown in FIG. 4, the rendering apparatus 101 and image bitmap memory 104 shown in FIG. 1 are applied to an image forming apparatus having four print processes.

Referring to FIG. 4, a process list 401 is formed on the memory 102 shown in FIG. 1. Engine interfaces 402 output Y, M, C, and K image data bitmapped on the memory 104 to corresponding developing units of a print engine. Reference numeral 403 denotes a developing unit; 404, a transfer belt; and 405, printing paper. An image is generated and printed in synchronism with the printing operation of the print engine. With this operation, high-speed color printing can be executed.

In the first embodiment, image formation uses a band scheme. One page of print data is divided into a plurality of bands. A process list for rendering print data in the band is prepared for each band, and an image is rendered for each band. The memory 104 shown in FIG. 4 is divided into areas of each color, i.e., two areas for each of Y, M, C, and K bands (i.e., eight areas including first and second areas). While data of one band rendered in the first areas of the colors is being printed, data is rendered in the second areas. When printing of the data in the first areas is ended, the data in the second areas is printed and data is rendered in the first areas. In this way, the image memory is alternately used by switching the areas for each band.

In this way, by parallelly printing and rendering for each band, high-speed printing can be executed with a small image memory capacity. In this embodiment, the above-described parallel processing of printing and rendering is executed in synchronism with a print process in each of Y, M, C, and K.

The process list 401 shown in FIG. 4 is the process list of one band. Rendering operation is activated with a time lag between the print processes of the respective colors in the order of operations of print processes using the common process list. Hence, for a given band, rendering of Y is activated first, and then, M, C, and K are sequentially rendered. As described above, Y, M, C, and K render separate commands in a single process list, and each rendering operation is executed in accordance with the address pointers 105 of the process list shown in FIG. 1. In addition, the respective color data are rendered on the image memory 104 shown in FIG. 4 at a uniform rendering speed.

The engine interfaces 402 send the data of a rendered band from the image memory 104 to the developing units 403 in accordance with the sync signal of the print engine. The images are developed on the transfer belt 404. The Y, M, C, and K images are superposed and developed on the transfer belt 404 and transferred and fixed to the printing paper 405, thereby obtaining a print image. With this arrangement, color images can be simultaneously generated by one rendering apparatus.

An example wherein the rendering apparatus 101 shown in FIG. 1 is applied to a color laser printer having four drums will be described next.

FIG. 5 is a block diagram showing the schematic arrangement of a color printer according to the first embodiment. Referring to FIG. 5, reference numeral 101 denotes the rendering apparatus according to the first embodiment; 102, the main memory; 104, the image memory; 402, the engine interface; 501, an interrupt controller; 502, a CPU; 503, an IO port; 504, a memory controller; 505, an interface; and 506, a print engine having a print process for each color.

Figure 6A:
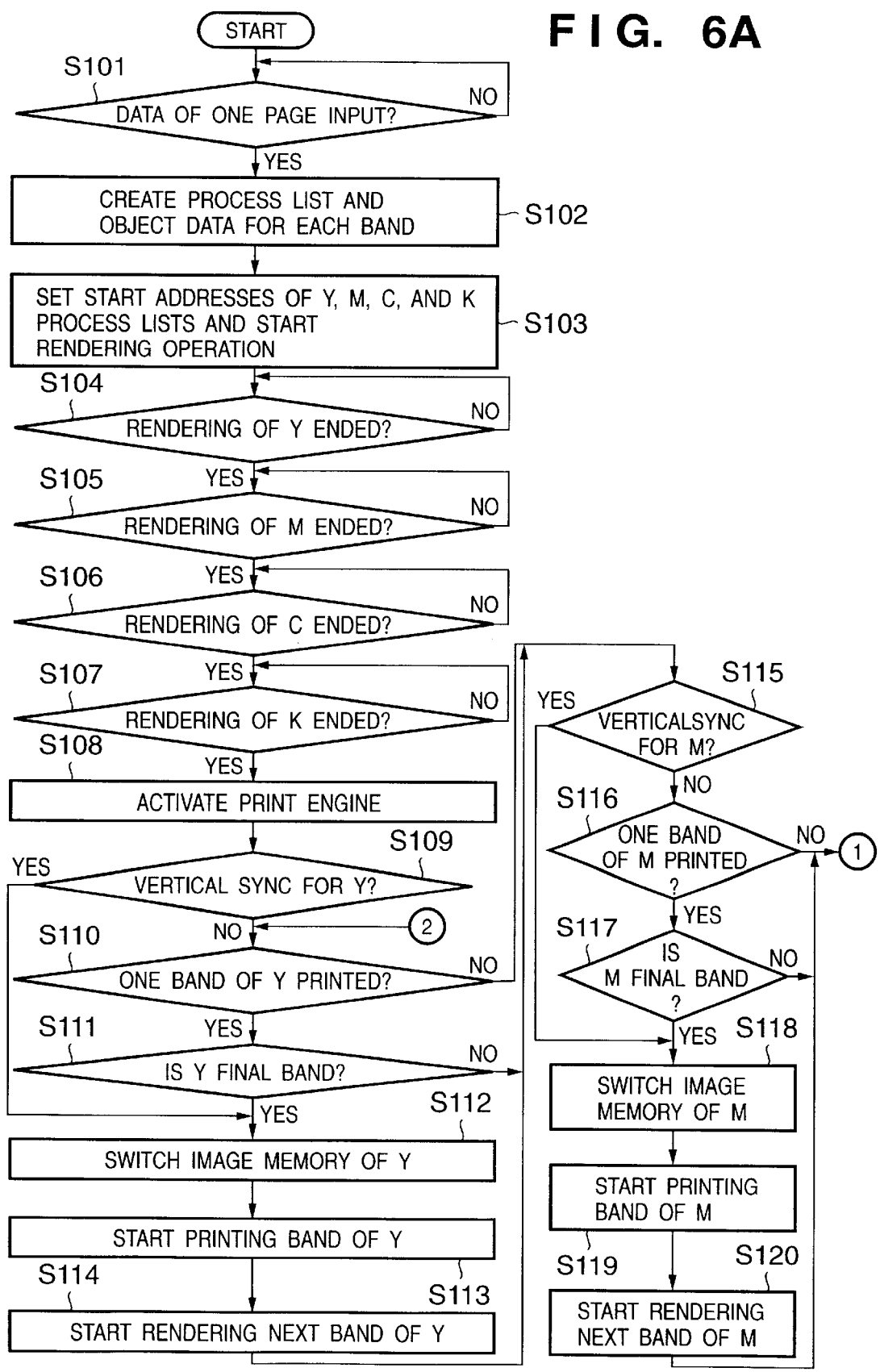
FIG. 6A is a flow chart showing CPU processing in printing data of one page by the color printer shown in FIG. 5.
Figure 6B:
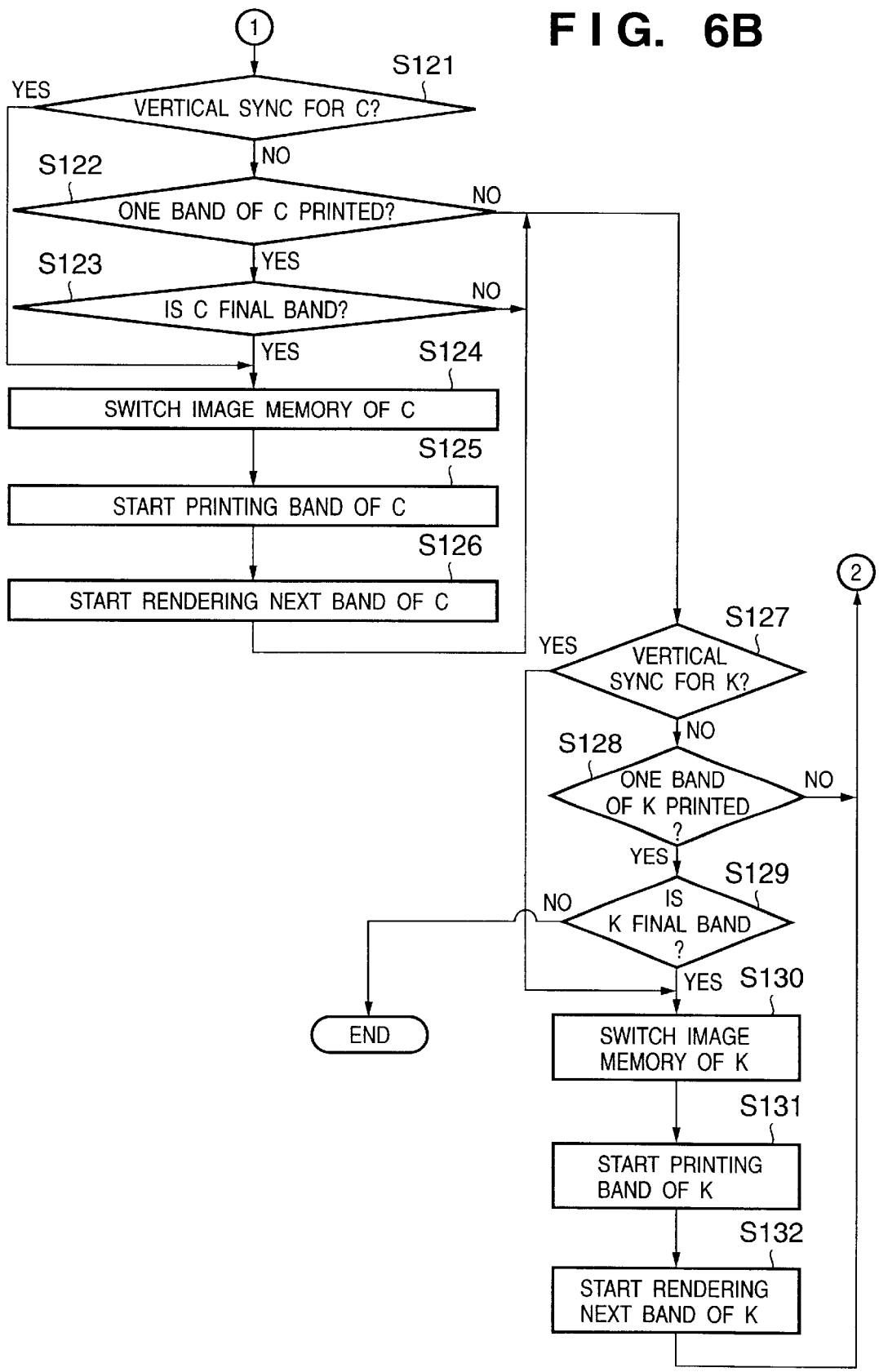
FIG. 6B is a flow chart showing CPU processing in printing data of one page by the color printer shown in FIG. 5.

FIGS. 6A and 6B are flow charts showing CPU processing in printing data of one page by the color printer shown in FIG. 5. Operation of printing one page by the color printer will be described with reference to FIGS. 1, 5, 6A, and 6B.

In step S101, print data output from an information processing apparatus such as a computer connected through an interface cable or network is received by the interface 505. When the data is written on the main memory 102 by the memory controller 504, the CPU 502 determines whether print data of one page has been written on the main memory 102. If NO in step S101, the processing waits for the write of the data. If YES in step S101, the flow advances to step S102 to decode the print data of one page written on the main memory 102. On the basis of the result, a rendering process list of each band and object data having data of four colors, i.e., Y, M, C, and K are created on the main memory 102.

In step S103, the start addresses of Y, M, C, and K data of the process list in the first print band are set in address pointers 1 to 4 (the address pointers 105 in FIG. 1) of the process list in the rendering apparatus 101 through the system bus shown in FIG. 5. In this embodiment, since a process list common to the colors is used, the same value is set in address pointers 1 to 4. This operation is realized by executing specific write operation from the CPU 502 to the IO port 503 through the system bus. That is, when the CPU 502 writes predetermined data at a predetermined address of the IO port 503, activation signals 1 to 4 shown in FIG. 5 are output. These signals are connected to the activation signals of process lists 1 to 4 shown in FIG. 1. Hence, the control section 107 of the rendering apparatus 101 is instructed to activate the rendering apparatus.

When the rendering operation is activated, the control section 107 switches the selector 106 to input the process list address of process list address pointer 1 (105), outputs the start address to the rendering core 103, and starts rendering one process command by the rendering activation signal. The rendering core 103 outputs the address of the process list to the memory controller 504 to request process command data. The memory controller 504 reads out the data at the requested address from the main memory 102 and outputs the data to the rendering apparatus 101. The rendering core 103 generates the address of object data to be used from the process command, outputs the address of object data to the memory controller 504, and receives the object data from the main memory 102. The object data input to the rendering core 103 is rendered on the image memory 104 as a bitmap image in accordance with the procedure indicated by the process command.

When one process command is ended, the rendering core 103 outputs a rendering end signal to the control section 107. Upon receiving the rendering end signal, the control section 107 increments the value of process list address pointer 1 (105) by one to update it to the address of the next process command. After that, the control section 107 switches the selector 106 to input the address of process list address pointer 2 (105) and outputs the address to the rendering core 103 as a start address. The rendering core 103 receives the process command and object data from the main memory 102 and executes the rendering operation, as in the above-described processing. When the operation is ended, the rendering core 103 outputs a rendering end signal to the control section 107. The control section 107 updates the value of process list address pointer 2 (105). Then, the control section 107 switches the selector 106, outputs the value of process list address pointer 3 (105) to the rendering core 103, and outputs a rendering activation signal to start the rendering operation. When rendering is ended, and a rendering end signal is output from the rendering core 103, rendering for process list address pointer 3 (105) is executed, as in the above-described processing.

In this way, using the single rendering core 103, four independent color data are time-divisionally rendered in accordance with the respective process lists in the order of, e.g., process list address pointers 1, 2, 3, 4, 1, 2, . . . . When the received process command is a rendering end command, the rendering core 103 outputs a process list end signal to the control section 107. Upon receiving the process list end signal, the control section 107 recognizes that the process list that is currently being executed is ended, and outputs an end interrupt to the outside. That is, when rendering of process list address pointer 3 is being currently selected, a process list 3 end interrupt is generated. Until re-activation is done by a process list 3 activation signal, rendering of process list address pointer 3 is not executed. The interrupt controller 501 notifies the CPU 502 that rendering by the Y, M, C, and K process lists is ended independently using process list 1 to 4 end interrupt signals as rendering end interrupts 1 to 4.

In steps S104 to S107, the end of the rendering operation of the first print band of Y, M, C, and K is waited, as described above. In step S108, the print engine is activated to start printing.

In step S109, it is determined whether the vertical sync signal of print color Y of the print engine has been received. The vertical sync signal is a signal that indicates a printing start timing for Y, M, C, and K from the print engine 506 and is input to the IO port 503. The CPU 502 can know the timing of vertical synchronization of each color through the IO port 503. If YES in step S109, the flow advances to step S112 to switch the image memory of Y. In step S113, band printing of Y is started. To start printing, the CPU 502 writes predetermined data at a predetermined address of the IO port 503, and an activation signal Y, M, C, or K is output from the IO port 503 to the engine interface 402. The engine interface 402 reads out necessary image data from the image memory 104, converts the data into video data, and sends the video data to the print engine 506 for printing. In step S114, the start address of the process list of the next band is set at process list address pointer 1 (105), and a process list 1 activation signal is output to start printing. Detailed processing is the same as described above.

On the other hand, if NO in step S109, the flow advances to step S110 to determine whether printing of the print band is ended. When the engine interface 402 sends video data of one band to the print engine 506, a band printing end signal Y, M, C, or K is output whereby the interrupt controller 501 notifies the CPU 502 of the end of printing of the band of each color. If printing of the first band is not activated, printing is not ended, and the flow advances to step S115. After activation of printing, it is determined whether printing is ended, and interband processing is executed in steps S112 to S114. Similar algorithms are prepared for print color M in steps S115 to S120, for print color C in steps S121 to S126, and for print color K in steps S127 to S132. These algorithms execute interband processing, i.e., detection of the start/end of band printing, switching of the image memory, the start of rendering of the band, and the end of printing of the page independently for the respective colors.

In steps S111, S117, S123, and S129, it is determined whether the printed band is the final band. If the printed band is the final band, the flow advances to processing of another color without executing subsequent band switching and printing/rendering start processing. In the print process, K is the final band. Hence, if it is determined in step S129 that the printed band is the final band, print processing of one page is ended. In this embodiment, through the loop of algorithms shown in FIGS. 6A and 6B, print processes of the respective colors are independently controlled and executed while detecting the end of band printing and activating the next band.

As described above, when the rendering apparatus according to the present invention is used, a color printer having a four-color simultaneous printing mechanism such as a four-drum color LBP can be implemented by one rendering apparatus.

Second Embodiment

The second embodiment of the present invention will be described next in detail with reference to the accompanying drawings.

In the first embodiment, four process list address pointers are prepared to independently control four, Y, M, C, and K colors. In the second embodiment, two process list address pointers are prepared to simultaneously control two colors.

FIG. 7 is a block diagram showing the schematic arrangement of a rendering apparatus according to the second embodiment. Referring to FIG. 7, a rendering apparatus 701 according to the second embodiment has two process list address pointers. The remaining components are the same as in the first embodiment shown in FIG. 1, and a description thereof will be omitted here.

Figure 8:
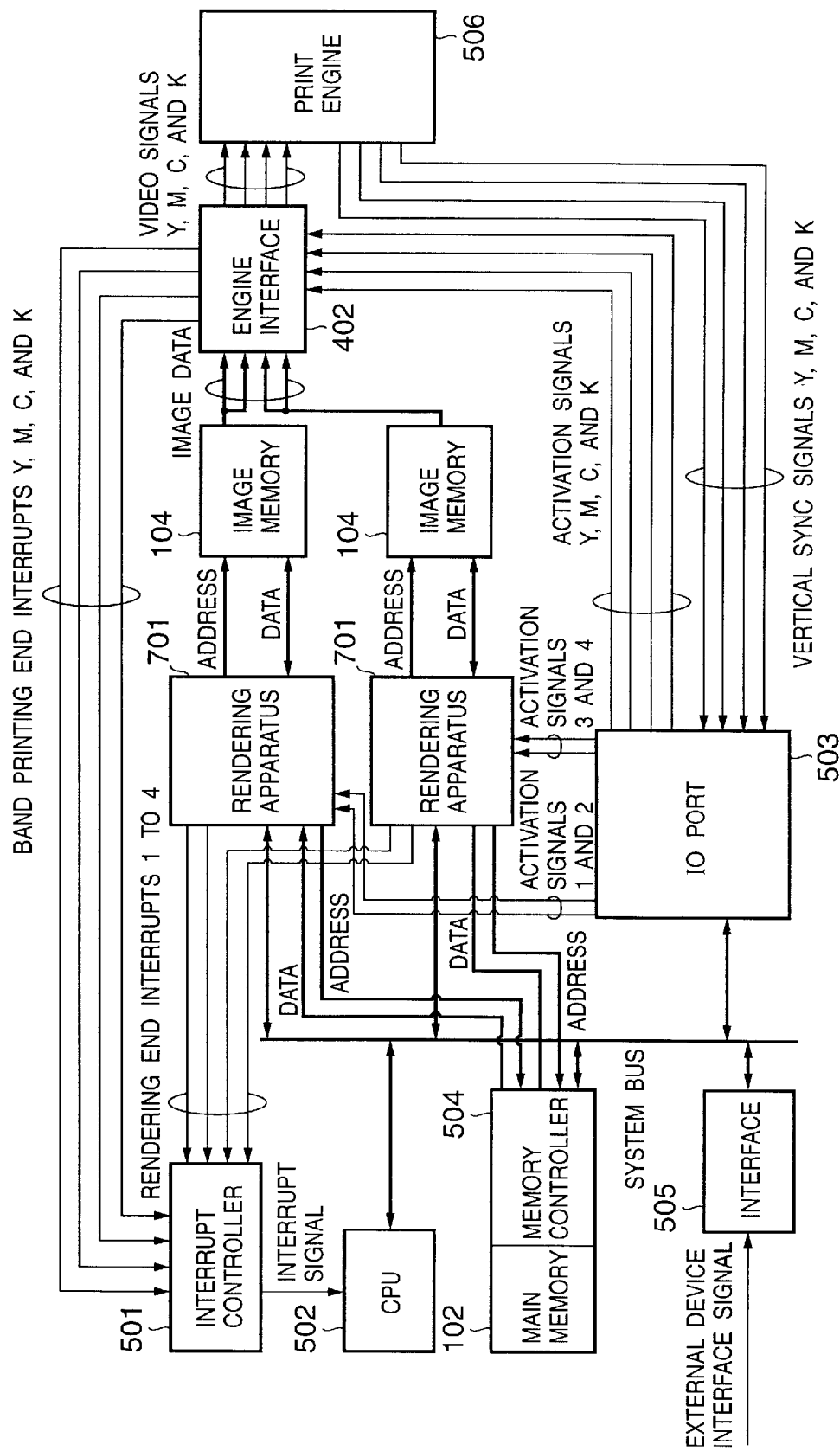
FIG. 8 is a block diagram showing the schematic arrangement of a color printer according to the second embodiment.

FIG. 8 is a block diagram showing the schematic arrangement of a color printer according to the second embodiment. As shown in FIG. 8, the color printer is implemented using two rendering apparatuses 701 shown in FIG. 7. As described above, each rendering apparatus 701 can simultaneously generate two color images because it has two process list address pointers, as described above. Two colors, e.g., Y and M, or C and K are simultaneously rendered by each rendering apparatus, and the rendering apparatuses are simultaneously controlled, thereby simultaneously rendering four colors.

As described above, according to the second embodiment, an optimum arrangement that meets requirements of various processing speeds and cost can be implemented by combining the apparatuses.

The present invention can also be applied to a case wherein images are to be output to a print engine capable of simultaneously forming images for first and second surfaces in a double-printing mode by preparing process list address pointers for processing the images of the first and second surfaces.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is achieved even by supplying a storage medium which stores software program codes for implementing the functions of the above-described embodiments to the system or apparatus and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, or the like can be used.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As described above, according to the embodiments, a plurality of address pointers for designating rendering process lists are prepared. Rendering operations indicated by the pointers are independently alternately executed to independently activate the rendering process lists represented by the pointers. The image generation timings are independently controlled, and interrupts representing the ends of processing of the rendering process lists indicated by the pointers are independently generated to independently recognize the end of image generation. With this arrangement, rendering processing by a plurality of process lists can be time-divisionally simultaneously executed by one rendering apparatus.

Hence, multicolor image generation by a color printer or the like can be inexpensive. In addition, multicolor rendering operation can be synchronized with the print engine to execute rendering in real time, resulting in further cost reduction.

The present invention is not limited to the above embodiments and various changes and modifications can be made within the spirit and scope of the present invention. Therefore, to apprise the public of the scope of the present invention, the following claims are made.

What is claimed is:

1. A rendering apparatus for bitmapping object data into bitmap image data in accordance with a process list to generate rendering data, comprising:
    address designation means for designating a plurality of addresses to the process list;
    selection means for sequentially selecting one of the plurality of addresses designated by said address designation means; and
    rendering means for bitmapping object data into bitmap image data in accordance with the process list designated by the selected address to generate rendering data.

2. The apparatus according to claim 1, further comprising control means for independently activating and executing said rendering means for the process list designated by the selected address.

3. The apparatus according to claim 2, further comprising interrupt means for independently generating an end interrupt when execution by said rendering means is ended.

4. The apparatus according to claim 1, wherein the plurality of addresses correspond to four, Y, M, C, and K colors of a color image.

5. The apparatus according to claim 4, wherein said rendering means commonly processes process lists of the addresses corresponding to the four colors.

6. The apparatus according to claim 4, wherein said rendering means generates the rendering data from the process lists of the addresses corresponding to the four colors in accordance with common object data.

7. The apparatus according to claim 1, wherein the plurality of addresses correspond to two of four, Y, M, C, and K colors of a color image.

8. The apparatus according to claim 7, wherein said rendering means commonly processes process lists of the addresses corresponding to the two colors.

9. The apparatus according to claim 7, wherein said rendering means generates the rendering data from the process lists of the addresses corresponding to the two colors in accordance with common object data.

10. A printing apparatus for simultaneously outputting images to a printing medium using a plurality of image output sections, comprising:
    a rendering processing section for bitmapping object data into bitmap image data in accordance with a process list to generate rendering data;
    address designation means for designating addresses of a plurality of process lists to be processed by said rendering processing section;
    rendering control means for causing said rendering processing section to alternately execute rendering processing for the process lists at the plurality of addresses designated by said address designation means; and
    a plurality of image output sections for parallelly outputting a plurality of rendering data corresponding to the process lists obtained by said rendering control means to the printing medium.

11. The apparatus according to claim 10, wherein said plurality of image output sections are laid out along a convey path of the fed printing medium.

12. The apparatus according to claim 10, wherein said plurality of image output sections output images of different color components.

13. The apparatus according to claim 10, wherein said plurality of image output sections output images of different image planes.

14. A printing control apparatus for outputting image data to a plurality of image output sections for simultaneously outputting images to a printing medium, comprising:

a rendering processing section for bitmapping object data into bitmap image data in accordance with a process list to generate rendering data;

address designation means for designating addresses of a plurality of process lists to be processed by said rendering processing section;

rendering control means for causing said rendering processing section to alternately execute rendering processing for the process lists at the plurality of addresses designated by said address designation means; and output control means for outputting the plurality of rendering data corresponding to the plurality of process lists obtained by said rendering control means to a printing apparatus to make the plurality of image output sections simultaneously output the rendering data.

15. A rendering method of bitmapping object data into bitmap image data in accordance with a process list to generate rendering data, comprising:

the address designation step of designating a plurality of addresses to the process list;

the selection step of sequentially selecting one of the plurality of addresses designated in the address designation step; and the rendering step of bitmapping object data into bitmap image data in accordance with the process list designated by the selected address to generate rendering data.

16. The method according to claim 15, further comprising the control step of independently activating and executing the rendering step for the process list designated by the selected address.

17. The method according to claim 16, further comprising the interrupt step of independently generating an end interrupt when execution by the rendering step is ended.

18. The method according to claim 15, wherein the plurality of addresses correspond to four, Y, M, C, and K colors of a color image.

19. The method according to claim 18, wherein in the rendering step, process lists of the addresses corresponding to the four colors are commonly processed.

20. The method according to claim 18, wherein in the rendering step, the rendering data is generated from the process lists of the addresses corresponding to the four colors in accordance with common object data.

21. The method according to claim 15, wherein the plurality of addresses correspond to two of four, Y, M, C, and K colors of a color image.

22. The method according to claim 21, wherein in the rendering step, processes process lists of the addresses corresponding to the two colors are commonly processed.

23. The method according to claim 21, wherein in the rendering step, the rendering data is generated from the process lists of the addresses corresponding to the two colors in accordance with common object data.

24. A control method for a printing apparatus for simultaneously outputting images to a printing medium using a plurality of image output sections, comprising:

the rendering step of bitmapping object data into bitmap image data in accordance with a process list to generate rendering data;

the address designation step of designating addresses of a plurality of process lists to be processed in the rendering step; and the rendering control step of causing the rendering step to alternately execute rendering processing for the process lists at the plurality of addresses designated in the address designation step, wherein the plurality of image output sections parallelly output a plurality of rendering data corresponding to the process lists obtained in the rendering step to the printing medium.

25. The method according to claim 24, wherein the plurality of image output sections are laid out along a convey path of the fed printing medium.

26. The method according to claim 24, wherein the plurality of image output sections output images of different color components.

27. The method according to claim 24, wherein the plurality of image output sections output images of different image planes.

28. A control method for a printing control apparatus for outputting image data to a plurality of image output sections for simultaneously outputting images to a printing medium, comprising:

the rendering processing step of bitmapping object data into bitmap image data in accordance with a process list to generate rendering data;

the address designation step of designating addresses of a plurality of process lists to be processed in the rendering processing step;

the rendering control step of causing the rendering processing step to alternately execute rendering processing for the process lists at the plurality of addresses designated in the address designation step; and the output control step of outputting the plurality of rendering data corresponding to the plurality of process lists obtained in the rendering control step to a printing apparatus to make the plurality of image output sections simultaneously output the rendering data.

29. A program causing a computer to realize:

an address designation function of designating a plurality of addresses to a process list;

a selection function of sequentially selecting one of the plurality of addresses designated by the address designation function; and a rendering function of bitmapping object data into bitmap image data in accordance with the process list designated by the selected address to generate rendering data.

30. A program of a control method for a printing apparatus for simultaneously outputting images to a printing medium using a plurality of image output sections, the program causing a computer to realize:

a rendering function of bitmapping object data into bitmap image data in accordance with a process list to generate rendering data;

an address designation function of designating addresses of a plurality of process lists to be processed by the rendering function; and a rendering control function of causing the rendering function to alternately execute rendering processing for the process lists at the plurality of addresses designated by the address designation function, wherein the plurality of image output sections parallelly output a plurality of rendering data corresponding to the process lists obtained by the rendering function to the printing medium.

31. A program of a control method for a printing control apparatus for outputting image data to a plurality of image output sections for simultaneously outputting images to a printing medium, the program causing a computer to realize:

a rendering processing function of bitmapping object data into bitmap image data in accordance with a process list to generate rendering data;

an address designation function of designating addresses of a plurality of process lists to be processed by the rendering processing function;

a rendering control function of causing the rendering processing function to alternately execute rendering processing for the process lists at the plurality of addresses designated by the address designation function; and an output control function of outputting the plurality of rendering data corresponding to the plurality of process lists obtained by the rendering control function to a printing apparatus to make the plurality of image output sections simultaneously output the rendering data.

32. A computer-readable storage medium which stores the program of claim 29.

33. A computer-readable storage medium which stores the program of claim 30.

34. A computer-readable storage medium which stores the program of claim 31.

* * * * *

UNITED STATES PATENT AND TRADEMARK OFFICE
CERTIFICATE OF CORRECTION

PATENT NO.    : 6,663,210 B2
DATED         : December 16, 2003
INVENTOR(S)   : Murata It is certified that error appears in the above-identified patent and that said Letters Patent is hereby corrected as shown below:

Column 7,
Line 48, "waited," should read -- delayed --.

Column 9,
Line 27, "tooptical" should read -- to-optical --.

Column 11,
Line 32, "processes" should be deleted.

Signed and Sealed this

Fourteenth Day of September, 2004

JON W. DUDAS
*Director of the United States Patent and Trademark Office*